(12) United States Patent
Farnsworth et al.

(10) Patent No.: US 10,289,277 B2
(45) Date of Patent: May 14, 2019

(54) SYSTEMS AND METHODS FOR INFORMATION TECHNOLOGY PORTFOLIO KNOWLEDGE AND MANAGEMENT

(71) Applicant: Level 3 Communications, LLC, Broomfield, CO (US)

(72) Inventors: Paul W. Farnsworth, Niwot, CO (US); Martin M. Feltz, Castle Rock, CO (US); Jennifer Relfe, Broomfield, CO (US); Steven M. Rdzak, Arvada, CO (US); Chad D. Woods, Westminster, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 502 days.

(21) Appl. No.: 14/310,445

(22) Filed: Jun. 20, 2014

(65) Prior Publication Data
US 2014/0380207 A1    Dec. 25, 2014

Related U.S. Application Data

(60) Provisional application No. 61/837,561, filed on Jun. 20, 2013.

(51) Int. Cl.
*G06F 8/00* (2018.01)
*G06F 8/60* (2018.01)
*G06F 3/0483* (2013.01)
*G06F 3/0484* (2013.01)

(52) U.S. Cl.
CPC .......... *G06F 3/0483* (2013.01); *G06F 3/0484* (2013.01); *G06F 8/00* (2013.01); *G06F 8/60* (2013.01)

(58) Field of Classification Search
CPC .......... G06F 8/00; G06F 8/60; G06F 17/3056; G06F 3/0484; G06F 3/0483
See application file for complete search history.

(56) References Cited

U.S. PATENT DOCUMENTS

| | | | |
|---|---|---|---|
| 2004/0117783 A1* | 6/2004 | Kaminsky | G06F 8/71 717/169 |
| 2005/0131927 A1* | 6/2005 | Fildebrandt | G06F 8/34 |
| 2008/0189679 A1* | 8/2008 | Rodriguez | G06F 8/34 717/105 |
| 2012/0260236 A1* | 10/2012 | Basak | G06F 11/323 717/132 |
| 2014/0282189 A1* | 9/2014 | Bansal | G06F 3/04847 715/771 |
| 2015/0199197 A1* | 7/2015 | Maes | G06F 8/71 717/122 |

\* cited by examiner

*Primary Examiner* — Aaron Lowenberger (57) ABSTRACT

Aspects of the present disclosure involve methods and systems for managing various applications, services, configuration data, business data and the like corresponding to a business enterprise. An information technology portfolio knowledge and management system may generate an application management view configured to enable users to automatically manage the various applications, services, configuration data, and business data.

12 Claims, 10 Drawing Sheets

Full Name: API - External
Common Name: Enterprise API
Aliases:
Company:
Status: Active — 308
Version:
Classification: Web Service
Strategy: Invest

| General | Development | Production | Lifecycle | Business | Web Services | Enterprise Architecture | Documentation |

Review Status: Not Yet Defined

Business Continuity / Disaster Recovery
BCDR Review: ☐
Business Desired RTO (app): NotDefined
Business Desired RPO (data): NotDefined
Tested RTO: NotDefined
Estimated RTO: NotDefined
Tested RPO: NotDefined
Expected RPO: NotDefined

Compliance
SOX Tier:
Security Notes:
Security Flags: NSA Out of Scope

Legal
Matter | Hold Placed | Hold Released
No active legal holds

View in CMDB UI | Edit | Close

SYSTEMS AND METHODS FOR INFORMATION TECHNOLOGY PORTFOLIO KNOWLEDGE AND MANAGEMENT

CROSS REFERENCE TO RELATED APPLICATIONS

The present non-provisional utility application claims priority to U.S. Provisional Application No. 61/837,561 entitled "System and Methods For Information Technology Portfolio Knowledge And Management," filed on Jun. 20, 2013, and which is hereby incorporated by reference in its entirety.

TECHNICAL FIELD

Aspects of the present disclosure relate to methods and systems for managing heterogeneous technologies and/or applications of a business enterprise.

BACKGROUND

Many businesses, universities, governmental agencies and other enterprises today operate using a variety of heterogeneous technologies, business applications and other technological business resources to perform different electronic transactions, manage the enterprise, and collect and manage data. For example, it is common for a single business enterprise to use multiple and diverse applications and services to engage in various consumer, payroll, and/or business data management transactions. As the modern economy becomes more technologically complex and business requirements and opportunities change, many businesses require cross-enterprise collaborations among existing applications and services, as well as integration with new external technologies and systems, such as business-to-consumer and/or business-to-business applications. Thus, in today's enterprise environment, it is often the case that a business enterprise will employ various enterprise portfolio management and/or portfolio management tools in an attempt to intelligently manage their business applications and services. However, the diversity of tools and managing the same presents many challenges. For example, the continuous evaluation of costs and risks associated with a given application and/or services has become critical to a business enterprises' success.

Conventionally, integrating, reducing and eliminating redundancies, and/or extending existing business applications and services, or integrating existing business technologies and applications with newer external systems is difficult because of inconsistent interfaces, fragmented, differently formatted, and/or redundant data sources, and inflexible architectures. Such a lack of integration may present challenges when attempting to interpret and identify the relationships between the business applications and/or services of an enterprise, ultimately making it difficult for a business enterprise to make portfolio management decisions.

It is with these concepts in mind, among others, that various aspects of the present disclosure were conceived and developed.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure extend to methods, systems, and computer program products for managing various applications, services, configuration data, and business data commonly included within an portfolio of an enterprise. More particularly, an information technology portfolio knowledge and management system ("ITPKM") may generate one or more interfaces, collectively referred to as an "Application Management View" ("AMV"), that enables users to manage the various applications, services, web services and/or configuration data (collectively referred to herein as "configuration items") maintained within the portfolio of the enterprise. The configuration items represent the different items included within the portfolio that may be configured, re-configured, provisioned, and/or otherwise modified, etc. For example, various configuration items may be configured and/or re-configured to facilitate management of business data corresponding to the portfolio of the enterprise. As another example, various configuration items may be configured and/or re-configured to improve performance, reliability, capacity, and/or the like, of the various configuration items. The AMV may be accessed throughout the various life-cycles of the configuration items to establish consistency, ensure that each configuration item's functional and physical attributes are within its requirements, and ensure that each configuration item's design and configuration data is accurate.

Generally speaking, a portfolio represents a group of applications (e.g., which may include end-user and backend applications), services, and/or large datasets that are currently being used and maintained by an enterprise, which may be a business, university, governmental organization or other entity. For example, a business enterprise within the telecommunications industry (e.g., a telecommunications service provider) may include hundreds of applications, services and/or datasets for providing various telecommunication services, such as collaboration and cloud computing services, content delivery and distribution services, voice over internet protocol services, and/or the like. Additionally, such an enterprise may maintain other backend type applications that, when executed, manage the data generated by end-user applications, such as applications that maintain configuration data corresponding to end-user applications and web services, and/or any other type of application and/or service required by the enterprise to engage in its business transactions. It is not uncommon for an enterprise to have hundreds or even thousands of applications deployed within its network.

Although an enterprise may have hundreds of applications, services, and/or datasets, most enterprises only actively use a fraction of such items to engage in its day-to-day computing transactions. Such a situation may present many challenges and often results in costly maintenance and labor fees, data inefficiencies and potential security risks. Aspects of the present disclosure provide systems and methods that enable users to automatically manage the various items included in the portfolio of an enterprise in an efficient and effective manner by providing an AMV that visualizes or otherwise displays the current status of the various applications, services and/or datasets of the enterprise portfolio and how such items interrelate. Users, such as web service developers and/or business end-users, may interact with the AMV thereby simplifying a user's ability to develop, deploy, and manage items of the enterprise portfolio.

Figure 1:
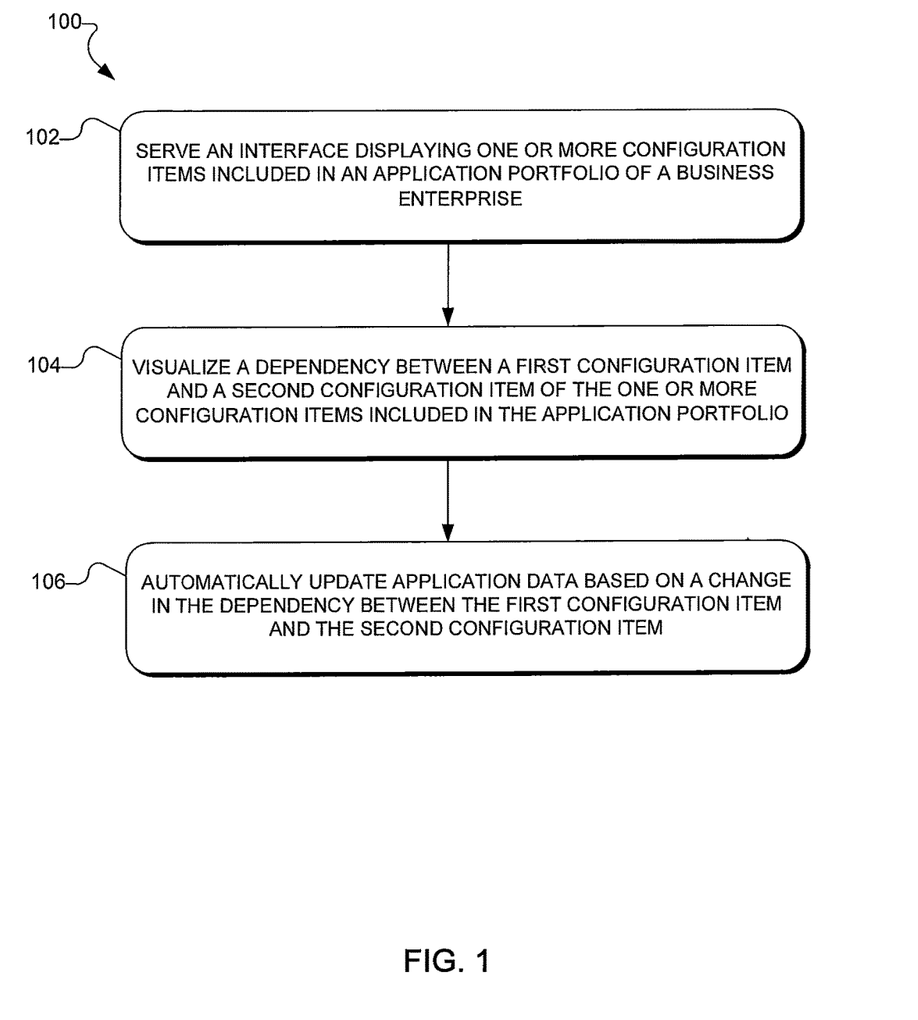
FIG. 1 is a flow chart for managing configuration items of a portfolio, according to aspects of the present disclosure.
Figure 2:
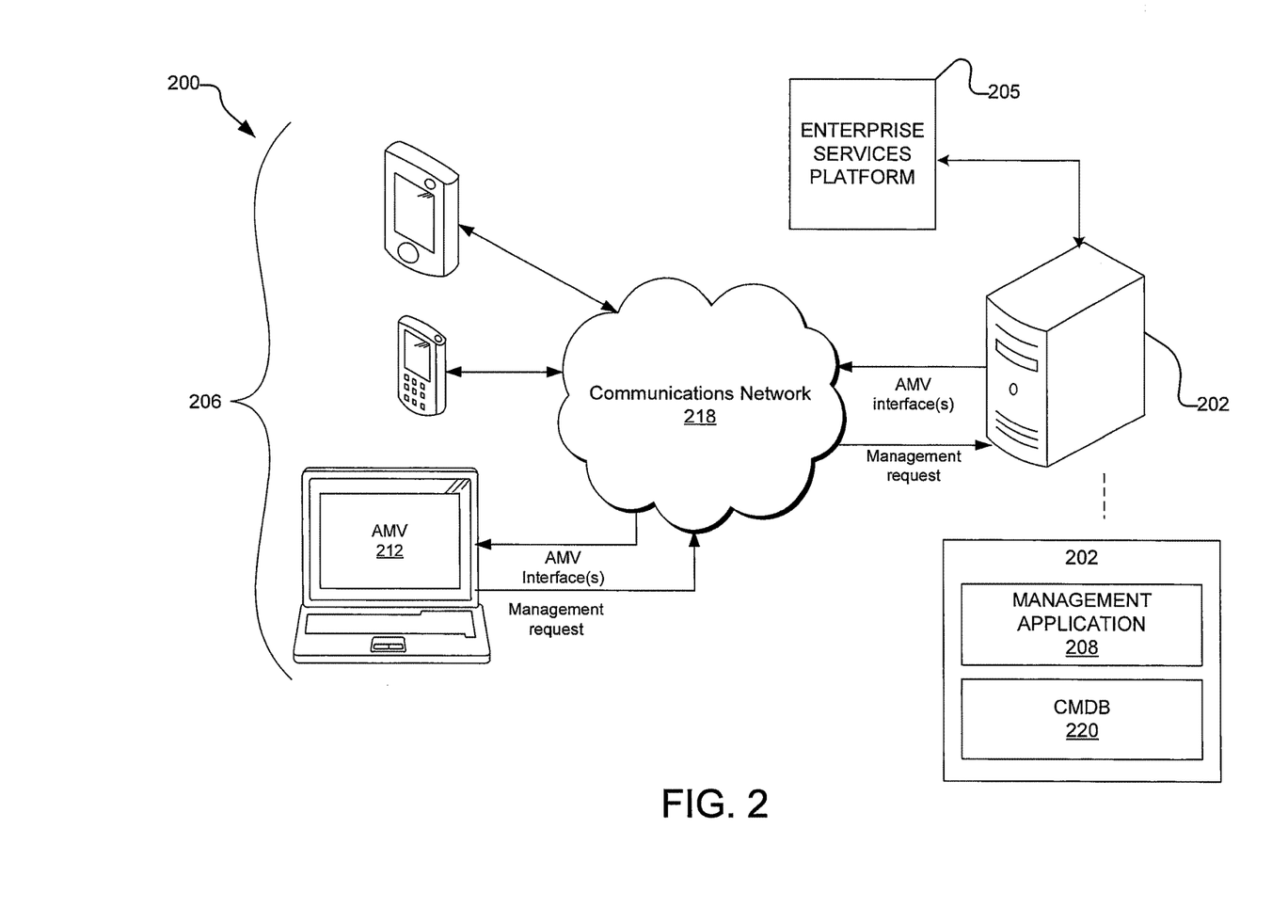
FIG. 2 is block diagram illustrating a computing environment for managing configuration items of a portfolio, according to aspects of the present disclosure.

An illustrative process and system for managing an portfolio of a business enterprise is depicted in FIGS. 1-2. In particular, FIG. 1 illustrates an example process 100 for generating an AMV capable of managing various configuration items (e.g., applications and services) of the enterprise. FIG. 2 illustrates a computing environment 200 including an ITPKM 202 configured to generate the AMV 212. Thus, FIG. 2 illustrates a computing environment 200 including the ITPKM 202 operating in conjunction with various other hardware and/or software components (operating on hardware) that may be used to perform or otherwise execute the process 100.

Referring now to FIG. 1, process 100 begins with serving an AMV for display to a user that visualizes one or more configuration items included in an portfolio of an enterprise (operation 102). Referring to FIG. 2, the AMV 212 is served from the ITPKM 202 to a user device 206. Stated differently, the ITPKM 202 may provide a mechanism, process, and/or application, such as a management application 208, which, when executed, generates the AMV 212, which may be served or deployed to a browser located at the user device 206. The user device 206 may be a personal computer, work station, server, mobile device, mobile phone, processor, or other type of client device. The ITPKM 202 may communicate with the user device 206 over a network 218, which includes any number of possible networks including a local area network, wide area network, wireless network, the Internet, and combinations of the same.

The served AMV 212 may include one or more interfaces/input forms (e.g. a user-interface or graphical user-interfaces (GUIs)) for enabling users to interact and/or visualize various configuration items and/or configurable aspects of the configuration items included within a portfolio of the enterprise. For example, the AMV 212 may include one or more interactive elements fields, and/or components that may be used to define or visualize various relationships between the configuration items (i.e., the applications, services, data, etc.) of the enterprise. In another embodiment, the AMV 212 may include one or more tools and/or tabs for managing a specific configuration item, such as an application or service, currently deployed within the network of the enterprise. Each tab represents a navigational widget that allows specific content corresponding to configuration items to be contained, viewed, and/or presented within the AMV 212. In one particular embodiment, the tabs may correspond to one or more aspects of the life-cycle of an application or service currently deployed by the business enterprise. An application life-cycle typically refers to the governance, development and maintenance of an application or service. For example, a content management application may require specific developmental and architectural, coding, testing, and release management requirements. The management of such phases of an application and its development is referred to as the application life-cycle. Thus, the AMV 212 may include a single tab for the architectural, coding, testing, and release management phases of the life-cycle corresponding to each phase. In yet another embodiment, the AMV 212 may include various other tabs, all of which present, display, or otherwise provide application data corresponding to one or more applications included in a portfolio of the enterprise.

The served AMV 212 may also present or otherwise display application data corresponding to some, or all, of the configuration items currently deployed and/or maintained within the portfolio of the enterprise. In particular, the various interfaces of the AMV 212 may include components configured to receive and/or define application data corresponding to the configuration items of the portfolio. In one embodiment, the application data may include one or more definitions and/or attributes corresponding to a particular configuration item included within the portfolio of the enterprise. A definition and/or attribute represents a characteristic of a configuration item that may be defined and viewed by a user accessing an interface of, or within, the AMV 212. For example, a user interested in a web service included within the portfolio of the enterprise may interact with the user device 206 to access the AMV providing application data corresponding to or otherwise defining definitions and/or attributes corresponding to the web service. The following is an example listing of various definitions and/or attributes that may be configured at the AMV 212 and stored as application data within CMDB 220. In one embodiment, a "name" definition may be included, which represents the fully qualified name of the application. A "classification" definition may be included that classifies the type of application. For example, an application may be an enterprise application, an infrastructure application, or a "component" application. A "software type" definition may classify the particular type of application or service. A "business criticality" definition may identify the applications that have the highest business priority. An "architecture domains" definition may identify the primary domain in which the application may be included. A "status" definition articulates the current state of a configuration item, such as whether the configuration item is in the planning, development, active, retired, archived, or decommissioned phase. A "strategy" definition identifies the strategic plan for the configuration item, such as whether the configuration item is undetermined, invested, maintained, decommission, or strategically archived. It is contemplated that any type of definition that articulates a standard characteristic of an application or service included within a portfolio may be included in the application data. Each of these attributes and/or definitions may be visualized on one or more of the interfaces of the AMV 212 in real time, or near real time. Users may interact with the interfaces to edit, modify, update, and/or add new attributes, definitions, and/or the like.

The application data may also include support contact information for identifying the appropriate person to contact in the event of a technical problem and information indicating which configurable items are currently having problems. Referring again to FIGS. 1 and 2, such application data may be provided to other external computing systems associated with the business enterprise in the form of a notification, such as an outage notification indicating that functionality associated with one or more of the configuration items, or the configuration item itself, are no longer functioning properly and which other configuration items or other functionality may be impacted by the outage. In one embodiment, application data may be provided to an enterprise services platform 205 that is capable of performing various business functions based on the received application data. For example, if the application data included information identifying a technical issue within one of the applications, web services and/or the like included within the portfolio of the enterprise, a notification may be sent to the enterprise system identifying the technical issue. In response, the enterprise services platform 205 may automatically trigger one or more business functions, which when executed, may remedy the technical problem.

The application data may further include definition and classification of the source of the application data being obtained. For example, the application data may be classified according to the corporate data model. The corporate data model represents a logical framework depicting the business view of critical data and keys, owned by an enterprise, which drives alignment through implementation. Within a given business, for example, multiple applications may share and/or replicate data. Under such contexts, it may be beneficial to only have one database or application that maintains the "official" data and/or dataset so as not to have different, un-reconcilable data sources. A source of record identifies which application is the official source for particular types of information (such as billing account information, billing cycle information, tax information, quote information, etc.). Thus, a user may interact with the various interfaces of the AMV 212, currently visualizing one or more applications, services and/or datasets of the enterprise portfolio and provide application data defining an official source of record for particular types of data included within the enterprise portfolio application data to the AMV 212 that defines a source of record identifying which configuration item is considered to be the official source for particular types of data.

The ITPKM 202 may include or otherwise be in communication with a configuration management database ("CMDB") 220 and may include memory and one or more processors or processing systems to receive, process, query and transmit communications and store and retrieve application data related to the various applications and services, or other components included within an portfolio of a business enterprise. Although the CMDB 220 of FIG. 2 is depicted as being located within the ITPKM 202, it is contemplated that the CMDB 220 may be part of a separate information technology infrastructure (e.g. a database) from the ITPKM 202, which may communicate with the ITPKM 202 via the communications network 218. In such a context, the management application 208 may interact with the CMDB 220 using one or more web services and/or related functionality and may be implemented according to a variety of different web service paradigms in their invocation and usage, such as for example, according to a representational state transfer ("REST") software paradigm or architecture.

Referring again to FIG. 1, various dependencies, relationships, categorizations, and/or other correlations may be defined and/or viewed between the various configuration items currently included within the portfolio of the enterprise. For example, the AMV may display the attributes, including a name, classification, and component attribute for each application, service, and/or data sets included within the portfolio. As another example, the AMV may display one or more dependencies for each of the applications, services, and/or data sets included within the portfolio. Stated differently, each application, service, and/or data set may relate to, or otherwise depend on other applications, services, or data sets to function properly. Thus, the AMV may visualize which items depend on other items. Knowing which configuration items are coupled, dependent, or otherwise related, provides knowledge on which applications may be impacted in the event one configuration item is modified, updated, fails, etc. Stated differently, in order to properly manage such dependencies and/or relationships, an enterprise must maintain the integrity of the application data corresponding to the configuration items currently active within the portfolio. For example, a telecommunication service may deploy new versions of applications and/or services currently deployed within its network, or terminate existing applications and/or services, resulting in a new relationship, dependency, correlation, or the like, between the new application versions and other configuration items included within the portfolio of the enterprise. In response, the application data maintained within the CMDB 220 of the ITPKM 202 may need to be updated or otherwise modified, in a manner that defines the changes occurring between the various application and/or services (i.e., configuration items).

Thus, a relationship or dependency between one or more configuration items within the portfolio of the business enterprise and/or its corresponding application data included in the portfolio of the enterprise may be defined or visualized (operation 104). Various mechanisms may be used to establish the relationships, such as application programming interfaces, discovery mechanisms, web services, and/or the like. For example, referring to the telecommunication service example above, in response to the deployment of a new version of the service, the ITPKM 202 may automatically discover an application programming interface ("API") coupled to the previous version of the telecommunication service, and automatically update the API to communicate with the new version of the telecommunication service to ensure continuous connectivity.

In another embodiment, any of the configuration items may be organized or otherwise arranged in defined sets, such as according to a functional domain that associates the items according to a common functionality. In the context of a business enterprise, a functional domain may correspond to a particular type of business transaction or process. In another embodiment, the configuration item may be configured according to a region in which the configured item may be used. For example, the configurable item may be associated with various regions or departments of a business such as: billing and rating, collaboration, customer management, delivery channels, enterprise management, finance, human resources, IT Infrastructure, network engineering, and the like. In yet another embodiment, the configuration item may be organized according to the host environment in which a configurable item resides.

Referring again to FIG. 1, any application data corresponding to the configuration items may automatically be updated in response to a change in dependency, relationship, reorganization, or other arrangement of configuration items (operation 106). More particularly, the source of record defining the relationship between the configuration items may be updated within the CMDB 220. Referring to the telecommunication services example above, in response to the deployment of the new version, the source of record corresponding to the telecommunication service may be automatically updated by the ITPKM 202 to indicate that the official data source for the telecommunication service is now the new updated version.

Figure 3A:
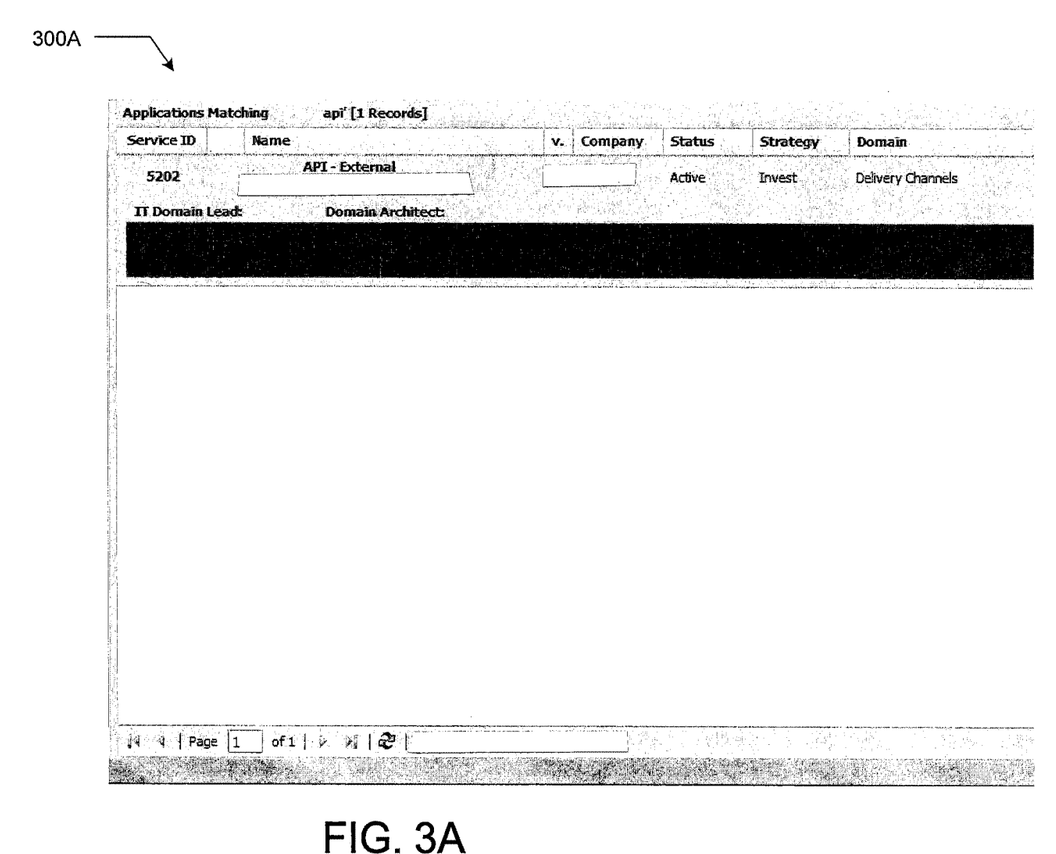
FIGS. 3A-3G are example screen shots of various embodiments of the present disclosure.

An illustrative example for managing one or more configuration items, such as for example one or more applications, included in a portfolio of an enterprise will now be provided. In particular, FIGS. 3A-3G illustrate a sequence of screen shots related to an example AMV being generated by the ITPKM system 202 and displayed at the client device 206. FIG. 3A represents an AMV displaying a configuration item in the form of an API Application, according to one embodiment. Thus, the API Application represents one example of a configuration item included within the portfolio of an enterprise.

Figure 3B:
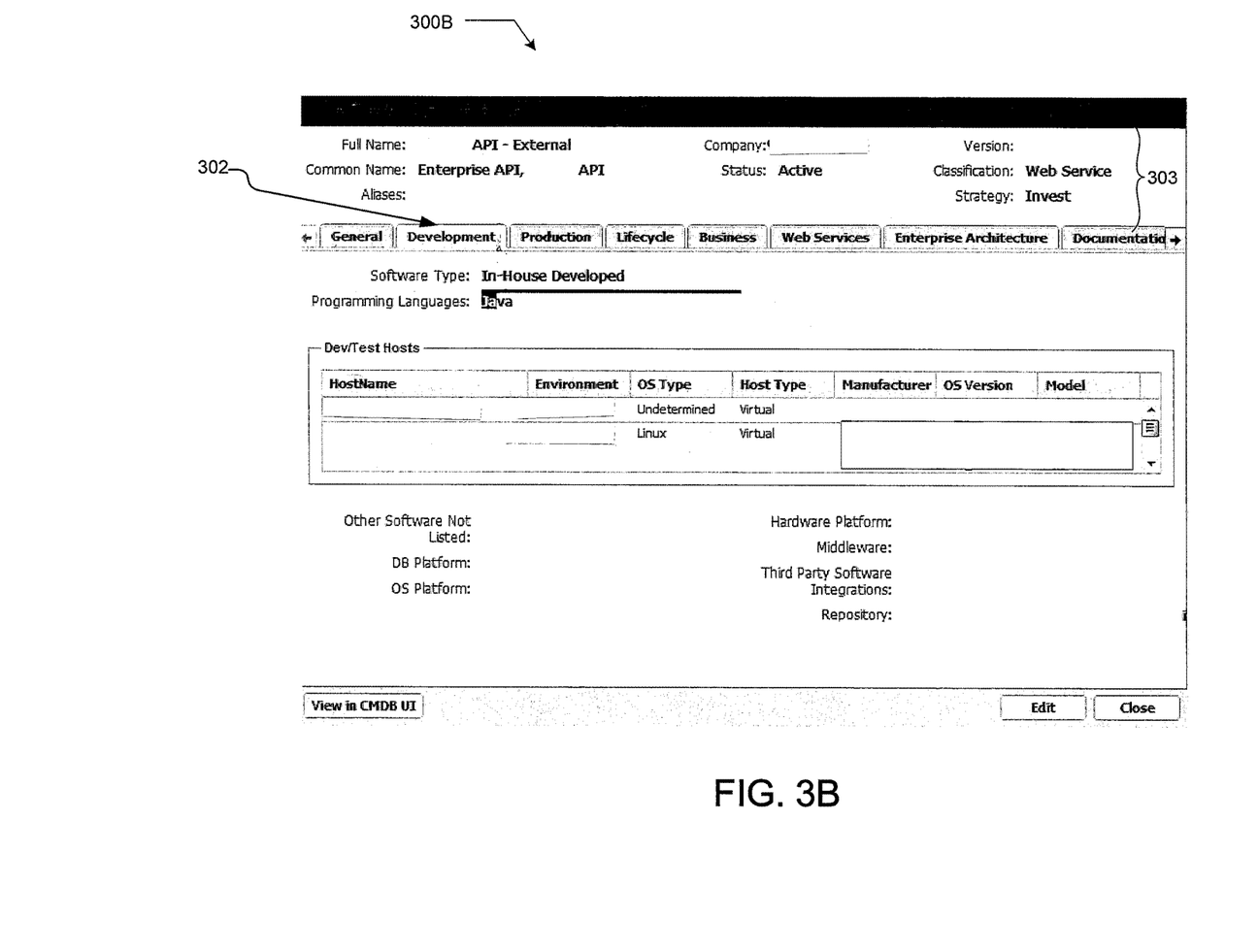
Figure 3C:
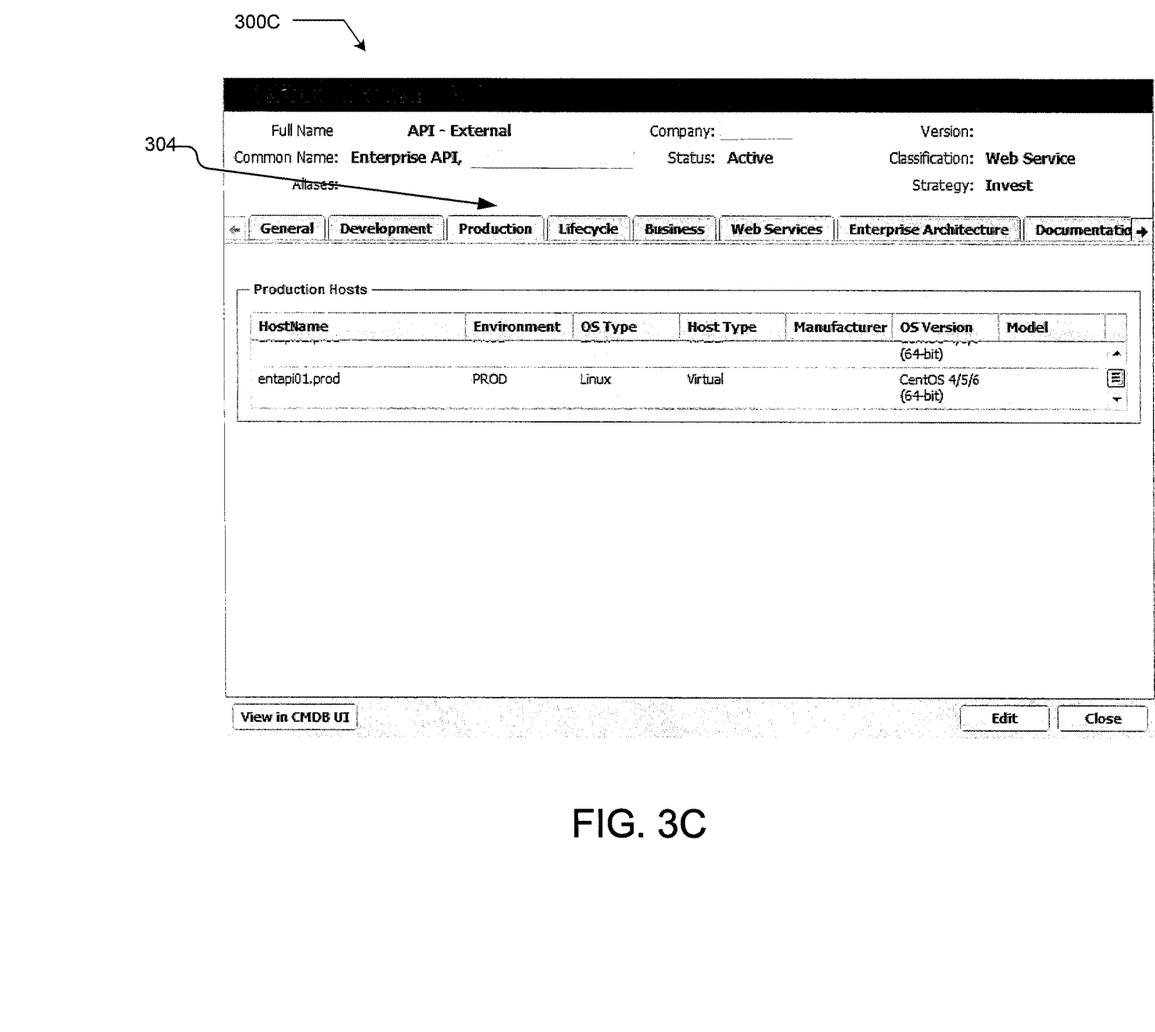
Figure 3D:
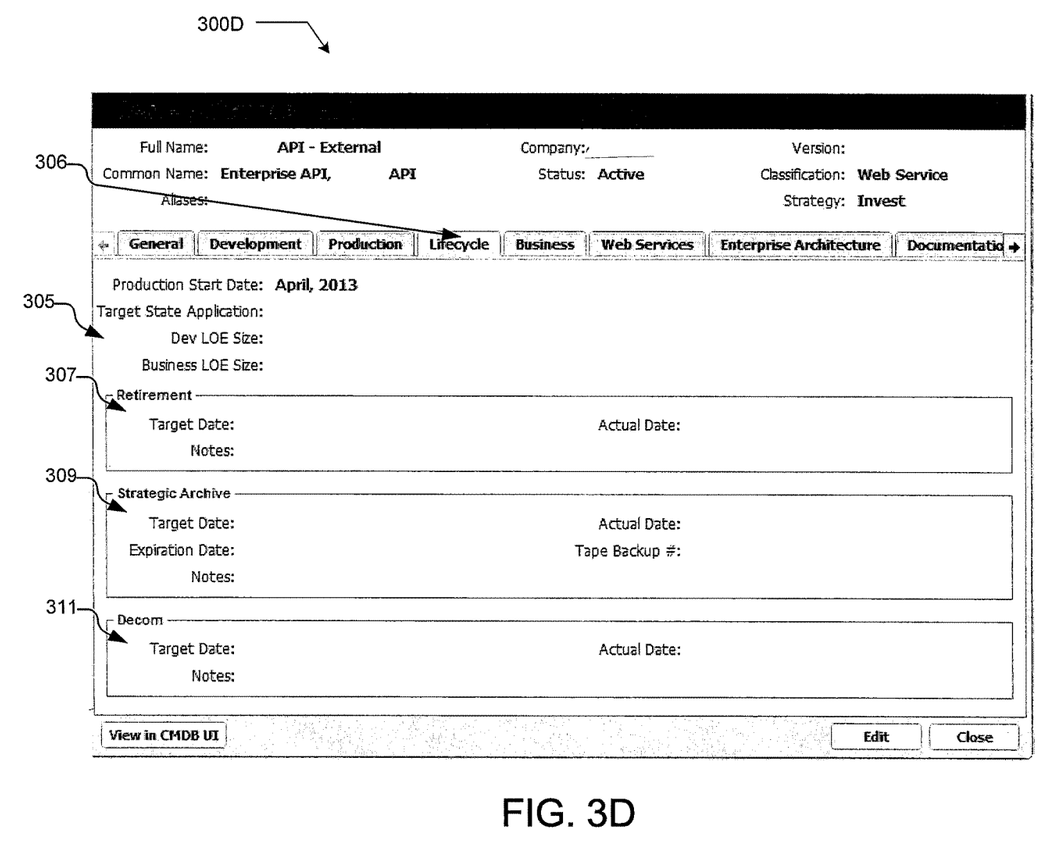
Figure 3E:
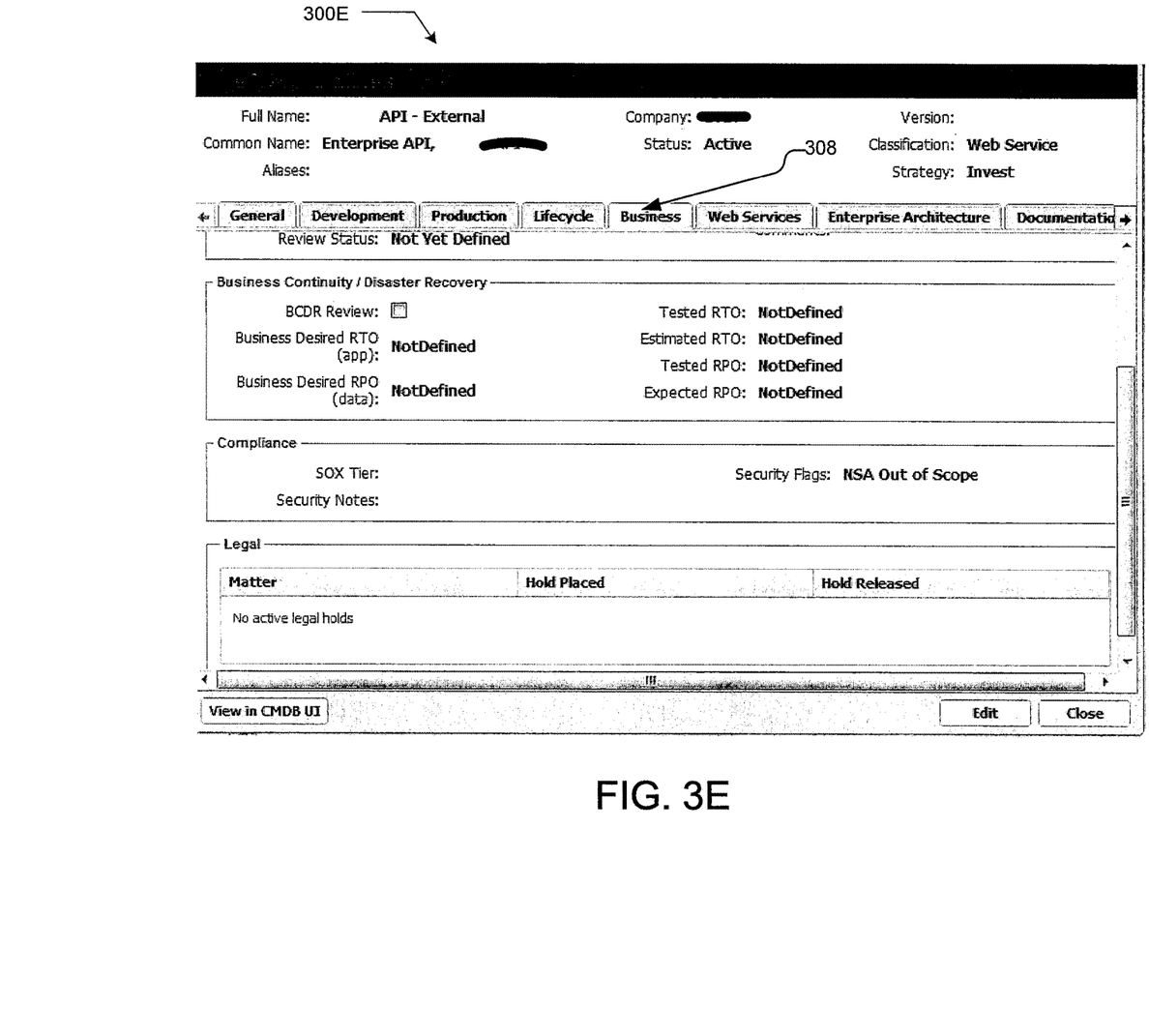
Figure 3F:
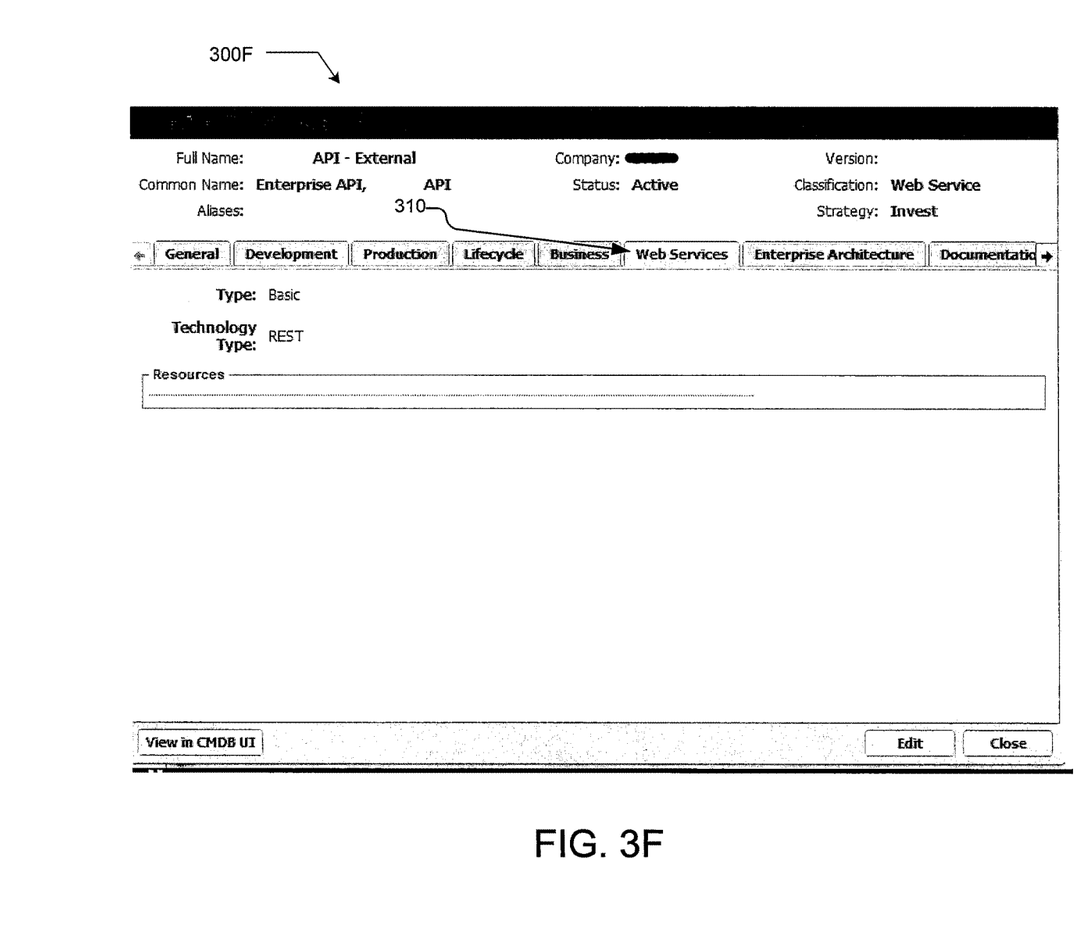

FIGS. 3B-3G illustrate various tabs 302, 304, 306, and 308 all of which provide and/or otherwise display application data corresponding to the API Application. For example, as illustrated in FIG. 3B, tab 302 presents various application data including definitions and attributes for defining the developmental aspects of the API application. In the illustrated embodiment, attributes and/or definitions 303 such as, a name, status, classification, and the like, may be visualized for the API application. Tab 304 of FIG. 3C illustrates various application data for defining production aspects of the API application. Tab 306 of FIG. 3D illustrates various application data for defining the application lifecycle of the API application. As illustrated in FIG. 3D, the life-cycle tab may display a "target state" application that identifies which system the application will be migrated to once it has been archived or decommissioned (at 305). Additionally, a "target date" and "actual date" definition may be displayed that represents either the forecasted date or the actual date the configuration item will be retired, archived, or decommissioned, at 307, 309, and 311 respectively. Tab 308 of FIG. 3E displays various application data for defining business aspects of the API application. Tab 310 of FIG. 3F illustrates various application data for defining web services aspects of the API application.

Figure 3G:
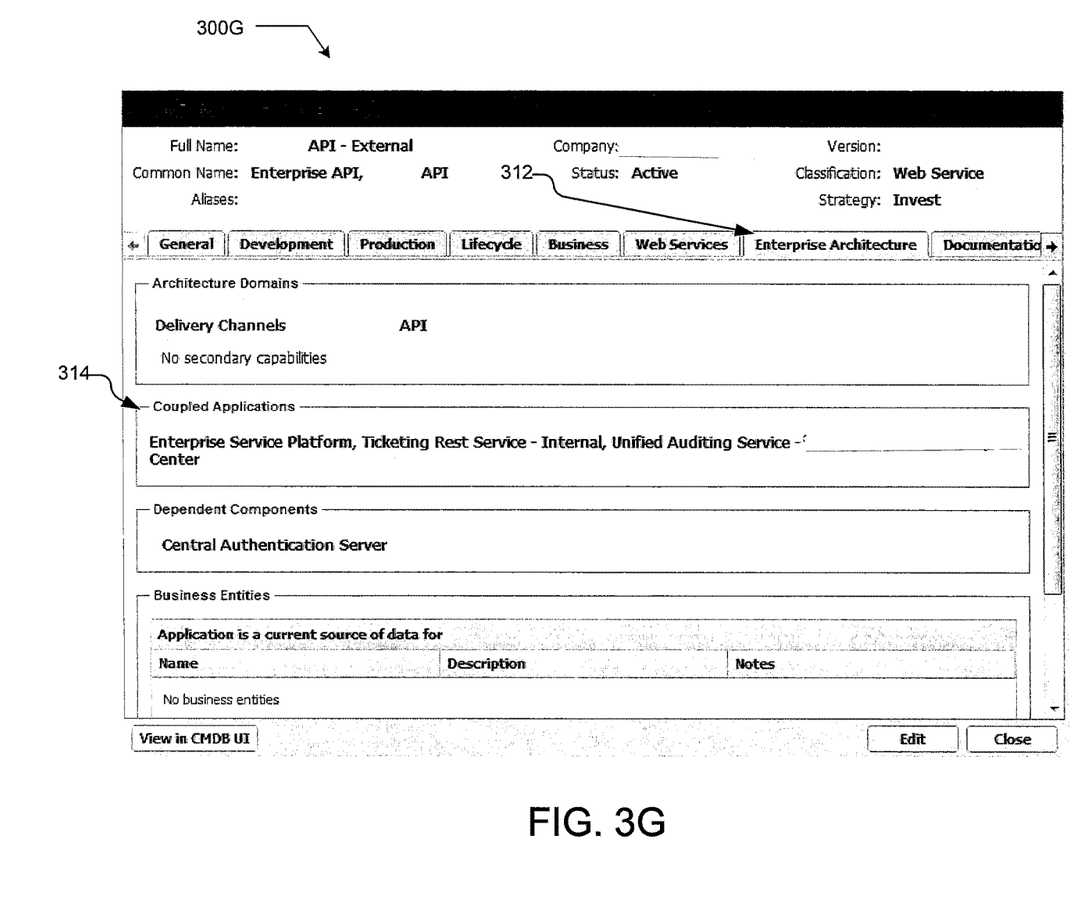

Tab 312 of FIG. 3G illustrates various application data for defining enterprise architecture aspects of the API application. In particular, Tab 312 provides or otherwise illustrates the relationship between the API Application and other configurable items included within the portfolio of the enterprise at 314. In the illustrated embodiment, the API Application is illustrated as being coupled to the Enterprise Service Platform, the Ticketing Rest Service-Internal, and the Unified Auditing Service—Internal. In one embodiment, as relationships between the configuration items are changed or modified the ITPKM 202 automatically updates the displayed AMV to reflect the changes. Thus, if the API application were decoupled from the Ticketing Rest Service—Internal application, Tab 312 would automatically be updated at 314 to illustrate that the two applications (or configurable items) are no longer coupled or otherwise associated. Additionally, the data within the ITPKM 202 is updated to reflect the changes.

Figure 4:
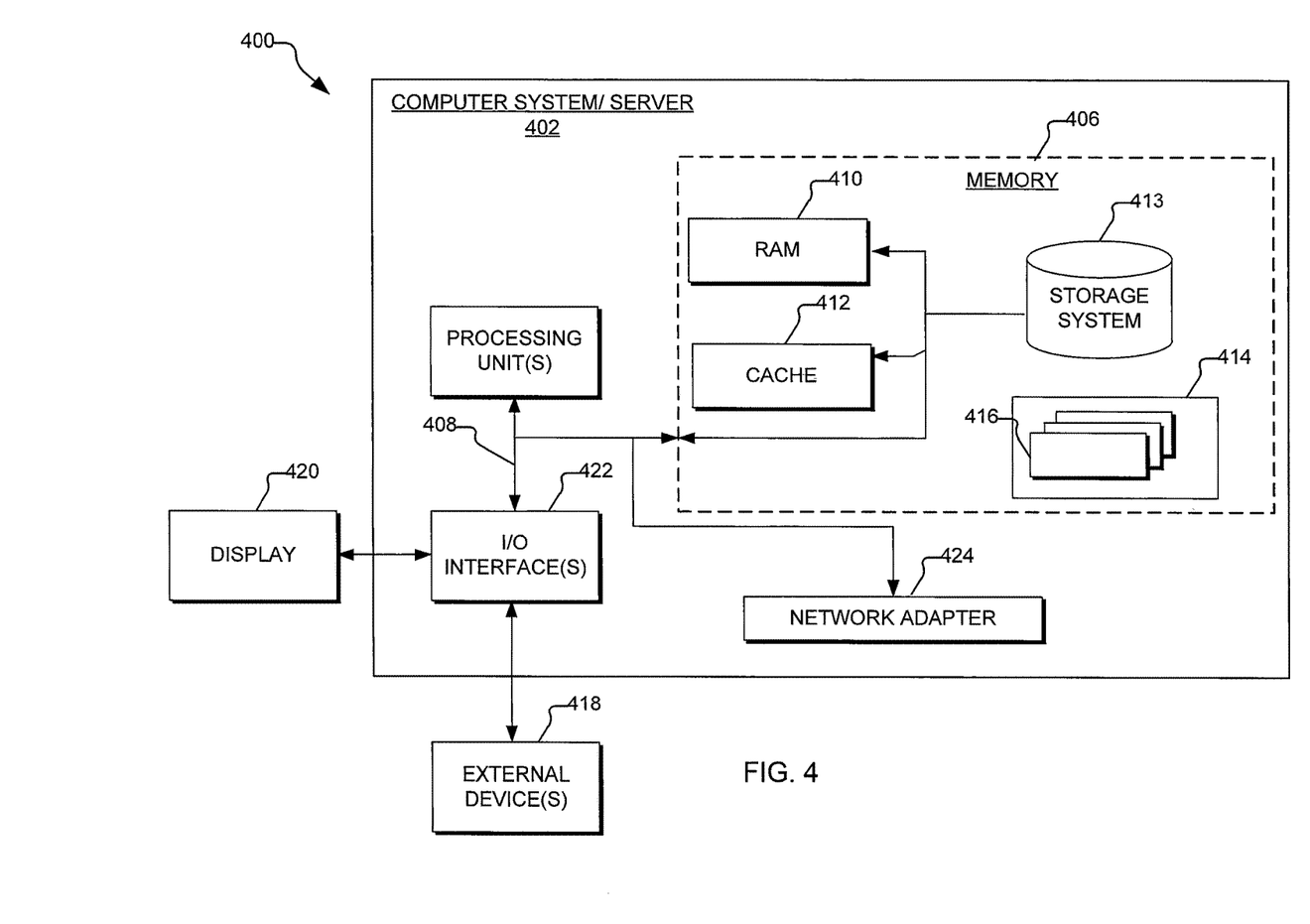
FIG. 4 is an example computing environment, according to aspects of the present disclosure.

FIG. 4 illustrates an example of a computing node 400 which may comprise an implementation of the server 202. The computing node 400 represents one example of a suitable computing device and is not intended to suggest any limitation as to the scope of use or functionality of embodiments of the invention described herein. Regardless, the computing node 400 is capable of being implemented and/or performing any of the functionality described above.

As illustrated, the computer node 400 includes a computer system/server 402, which is operational with numerous other general purpose or special purpose computing system environments or configurations. Examples of well-known computing systems, environments, and/or configurations that may be suitable for use with computer system/server 402 may include personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 402 in computing node 400 is shown in the form of a general-purpose computing device. The components of computer system/server 402 may include one or more processors or processing units 404, a system memory 406, and a bus 408 that couples various system components including system memory 406 to processor 404.

Bus 408 represents one or more of any of several types of bus structures, including a memory bus or memory controller, a peripheral bus, an accelerated graphics port, and a processor or local bus using any of a variety of bus architectures. Such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 may include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments of the invention as described herein.

Computer system/server 402 may also communicate with one or more external devices 418 such as a keyboard, a pointing device, a display 420, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 422. Still yet, computer system/server 402 can communicate with one or more networks such as a local area network (LAN), a general wide area network (WAN), and/or a public network (e.g., the Internet) via network adapter 424. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An application management system comprising:
    at least one computing device to:
        generate one or more interfaces for managing a plurality of configurable interrelating items of an information technology portfolio, each of the configurable interrelating items of the information technology portfolio including at least one of an application, a web service, or a dataset, the one or more interfaces displaying application data corresponding to the plurality of configurable interrelating items of the information technology portfolio, wherein at least first application data is replicated between at least a first configurable item and a second configurable item in the plurality of configurable interrelating items of the information technology portfolio;
        designate the first configurable item as a source of record for the first application data, wherein the source of record is an official source for the first application data among multiple configurable items storing the first application data;
        provide the one or more interfaces for display, wherein the one or more interfaces include a first interface to:
            based on the application data:
                display, at the first interface, at least the first application data that is replicated between the first configurable item and the second configurable item; display, at the first interface, a plurality of attributes corresponding to the first configurable item; and
                display at a second interface, the first application data and a plurality of attributes corresponding to the second configurable item; and
        determine that the first application data has been revised;
        automatically update the first display to show the revised first application data;
        automatically update the source of record with the revised first application data; and
        automatically update the second display to show the revised first application data based on the updated source of record.

2. The system of claim 1, wherein the first application data includes at least one dependency that defines a common functional domain for the first configurable item and the second configurable item.

3. The system of claim 1, wherein the one or more interfaces include a plurality of navigational tabs, each tab of the plurality of tabs corresponding to a manageable aspect of each configurable item of the plurality of configurable interrelating items.

4. The system of claim 1, wherein generating one or more interfaces comprises accessing a configuration management database containing the first application data.

5. A method for managing applications comprising:
    generating, using one or more computing devices, one or more interfaces for managing a plurality of configurable interrelating items of an information technology portfolio, each of the plurality of configurable interrelating items of the information technology portfolio including at least one of an application, a web service, or a dataset, the one or more interfaces displaying application data corresponding to the plurality of configurable interrelating items of the information technology portfolio, wherein at least first application data is replicated between at least a first configurable item and a second configurable item in the plurality of configurable interrelating items of the information technology portfolio;

designating the first configurable item as a source of record for the first application data, wherein the source of record is an official source for the first application data among multiple configurable items storing the first application data;

causing the display, on at least one of the one or more computing devices, of the one or more interfaces, wherein the one or more interfaces include a first interface to:

based on the application data:
display, at the first interface, at least the first application data that is replicated between the first configurable item and the second configurable item;
display, at the first interface, a plurality of attributes corresponding to the first configurable item; and
display at a second interface, the first application data and a plurality of attributes corresponding to the second configurable item; and determining that the first application data has been revised;

automatically updating the first display to show the revised first application data;

automatically updating the source of record with the revised first application data; and automatically updating the second display to show the revised first application data based on the updated source of record.

6. The method of claim 5, wherein the first application data includes at least one dependency that defines a common functional domain for the first configurable item and the second configurable item.

7. The method of claim 5, wherein the one or more interfaces include a plurality of navigational tabs, each tab of the plurality of tabs corresponding to a manageable aspect of each configurable item of the plurality of configurable interrelating items.

8. The method of claim 5, wherein generating one or more interfaces comprises accessing a configuration management database containing the application data corresponding to at least the first configurable item.

9. A non-transitory computer readable medium encoded with instructions for managing applications, the instructions, when executed by at least one processor, causing the at least one processor to:

generate one or more interfaces for managing a plurality of configurable interrelating items of an information technology portfolio, each of the plurality of configurable interrelating items of the information technology portfolio including at least one of an application, a web service, or a dataset, the one or more interfaces corresponding to the plurality of configurable interrelating items, wherein at least first application data is replicated between at least a first configurable item and a second configurable item in the plurality of configurable interrelating items of the information technology portfolio;

designate the first configurable item as a source of record for the first application data, wherein the source of record is an official source for the first application data among multiple configurable items storing the first application data;

provide the one or more interfaces for display, wherein the one or more interfaces include a first interface to:

receive application data corresponding to the first interface; and based on the application data:
display, at the first interface, at least the first application data that is replicated between the first configurable item and the second configurable item;
display, at the first interface, a plurality of attributes corresponding to the first configurable item; and
display at a second interface, the first application data and a plurality of attributes corresponding to the second configurable item; and determine that the first application data has been revised;

automatically update the first display to show the revised first application data;

automatically update the source of record with the revised first application data; and automatically update the second display to show the revised first application data based on the updated source of record.

10. The non-transitory computer readable medium of claim 9, wherein the first application data includes at least one dependency that defines a common functional domain for the first configurable item and the second configurable item.

11. The non-transitory computer readable medium of claim 9, wherein the one or more interfaces include a plurality of navigational tabs, each tab of the plurality of tabs corresponding to a manageable aspect of each configurable item of the plurality of configurable interrelating items.

12. The non-transitory computer readable medium of claim 9, wherein generating one or more interfaces comprises accessing a configuration management database containing the application data corresponding to at least the first configurable item.

* * * * *